United States Patent
Chamdani et al.

(10) Patent No.: US 7,460,528 B1
(45) Date of Patent: Dec. 2, 2008

(54) PROCESSING DATA PACKETS AT A STORAGE SERVICE MODULE OF A SWITCH

(75) Inventors: Joseph I. Chamdani, Santa Clara, CA (US); Litko Chan, San Jose, CA (US); Richard D. Reohr, Jr., Hillsboro, OR (US); Wilson K. Yee, Pleasanton, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 913 days.

(21) Appl. No.: 10/414,891

(22) Filed: Apr. 15, 2003

(51) Int. Cl.
*H04L 12/28* (2006.01)
*H04L 12/50* (2006.01)
*H04L 12/56* (2006.01)

(52) U.S. Cl. .................. 370/381; 370/392; 370/412

(58) Field of Classification Search ......... 370/381–383, 370/389, 392, 412–418
See application file for complete search history.

(56) References Cited

U.S. PATENT DOCUMENTS

| | | | |
|---|---|---|---|
| 6,034,957 A | 3/2000 | Haddock et al. | |
| 6,157,644 A * | 12/2000 | Bernstein et al. | 370/392 |
| 6,260,120 B1 | 7/2001 | Blumenau et al. | |
| 6,438,129 B1 | 8/2002 | Jennings et al. | |
| 6,594,234 B1 * | 7/2003 | Chard et al. | 370/236 |
| 6,636,518 B1 * | 10/2003 | Liencres | 370/395.7 |
| 6,693,878 B1 * | 2/2004 | Daruwalla et al. | 370/235 |
| 6,711,133 B1 * | 3/2004 | Suetsugu | 370/236.1 |
| 6,721,317 B2 * | 4/2004 | Chong, Jr. | 370/389 |
| 6,880,102 B1 | 4/2005 | Bridge | |
| 6,914,906 B1 | 7/2005 | Mullens et al. | |
| 6,970,943 B1 | 11/2005 | Subramanian et al. | |
| 6,973,549 B1 | 12/2005 | Testardi | |
| 7,027,390 B2 | 4/2006 | Wakai et al. | |
| 7,039,732 B1 * | 5/2006 | House | 710/100 |
| 7,039,827 B2 | 5/2006 | Meyer et al. | |
| 7,051,121 B2 | 5/2006 | Ohno et al. | |
| 7,120,728 B2 | 10/2006 | Krakirian et al. | |
| 7,133,416 B1 * | 11/2006 | Chamdani et al. | 370/466 |
| 7,167,472 B2 | 1/2007 | Wu et al. | |
| 7,173,939 B2 * | 2/2007 | Takamichi | 370/401 |
| 7,239,641 B1 | 7/2007 | Banks et al. | |

(Continued)

OTHER PUBLICATIONS

Schulz, Greg; "*Storage virtualization: An overview; Virtualization, or abstraction, can be implemented in many ways, and in many different locations*", INFOSTOR, http://infostor.Archives.printthis.clickability.com/pt/printThis?clickMap=printThis&FB=Y&..., *Infostar*, Aug. 2000, pp. 1-8, printed Sep. 17, 2002.

(Continued)

*Primary Examiner*—Ronald Abelson
(74) *Attorney, Agent, or Firm*—Hensley Kim & Holzer, LLC

(57) ABSTRACT

Routing a data packet of an information unit sequence includes receiving at a switch a data packet of an information unit sequence of a block storage exchange from a storage client, where the sequence is associated with a source identifier and a target identifier identifying a target. A storage resource identifier corresponding to the target identifier is determined according to a forwarding table. A sequence identifier is associated with the source identifier, where the sequence identifier corresponds to the target. The source identifier and the sequence identifier are recorded at a context table, and the data packet is routed according to the storage resource identifier.

20 Claims, 7 Drawing Sheets

U.S. PATENT DOCUMENTS

| | | |
|---|---|---|
| 7,251,217 B2 * | 7/2007 | Wong et al. ............... 370/232 |
| 2002/0152339 A1 | 10/2002 | Yamamoto |
| 2002/0156984 A1 | 10/2002 | Padovano |
| 2002/0161983 A1 | 10/2002 | Milos et al. |
| 2003/0002503 A1 | 1/2003 | Brewer et al. |
| 2003/0074388 A1 | 4/2003 | Pham et al. |
| 2003/0131182 A1 | 7/2003 | Kumar et al. |
| 2003/0140193 A1 | 7/2003 | Acharya et al. |
| 2003/0140210 A1 | 7/2003 | Testardi |
| 2003/0172149 A1 | 9/2003 | Edsall et al. |
| 2003/0204597 A1 | 10/2003 | Arakawa et al. |
| 2003/0210686 A1 | 11/2003 | Terrell et al. |
| 2004/0028063 A1 | 2/2004 | Roy et al. |
| 2004/0088574 A1 | 5/2004 | Walter et al. |
| 2004/0117438 A1 | 6/2004 | Considine et al. |
| 2004/0148376 A1 | 7/2004 | Rangan et al. |
| 2004/0151188 A1 | 8/2004 | Maveli et al. |
| 2005/0033878 A1 | 2/2005 | Pangal et al. |
| 2005/0050161 A1 | 3/2005 | Arnold et al. |

OTHER PUBLICATIONS

Chandra, Claudia; "*Three approaches to storage virtualization; There are three main methods to virtualize storage, each with advantages and disadvantages*", INFOSTOR, http://infostor.archives.printthis.clickability.com/pt/printThis?clipMap=printThis &fb=Y &...; *Infostor*, Nov. 2000, pp. 1-5, printed Sep. 17, 2002.

U.S. Appl. No. 10/414,889, filed Apr. 15, 2003, by Litko (nmi) Chan, et al., entitled "*Performing Block Storage Virtualization At A Switch*", 45 total pages.

U.S. Appl. No. 10/417,025, filed Apr. 15, 2003, by Litko (nmi) Chan, et al., entitled "*Forwarding A Data Packet According To A Source Identifier*", 45 total pages.

* cited by examiner

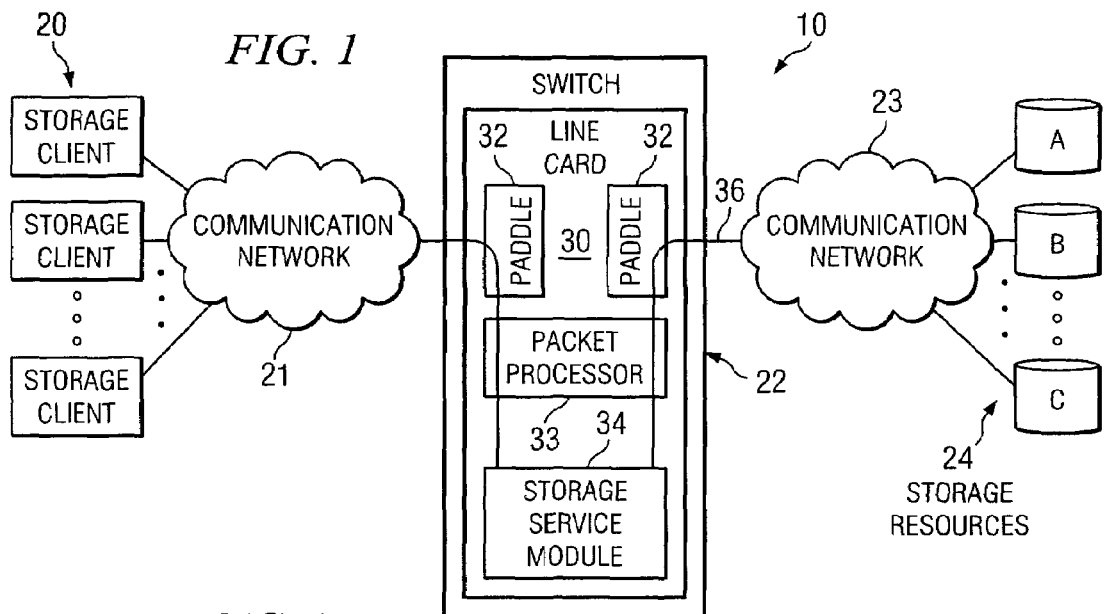

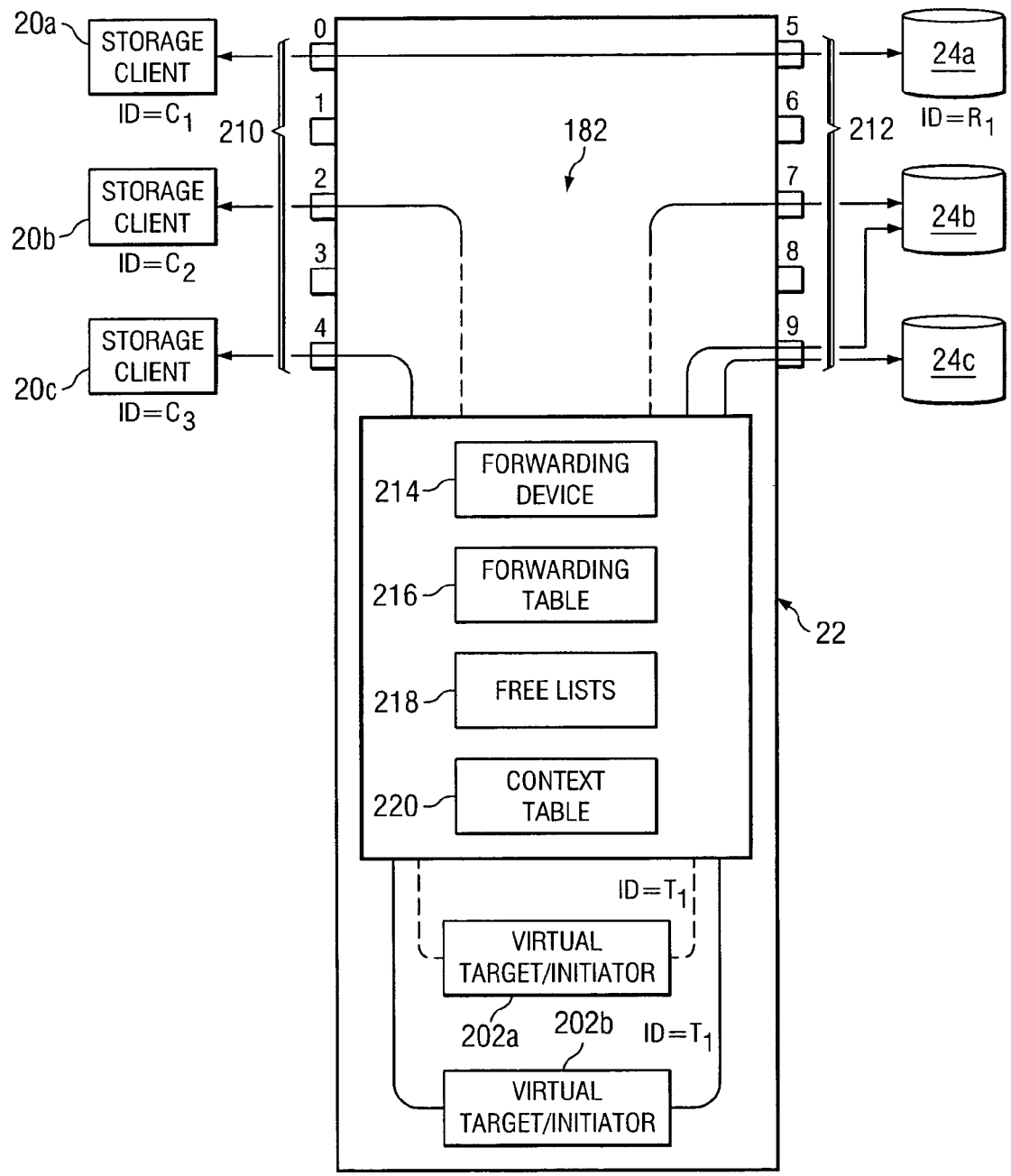

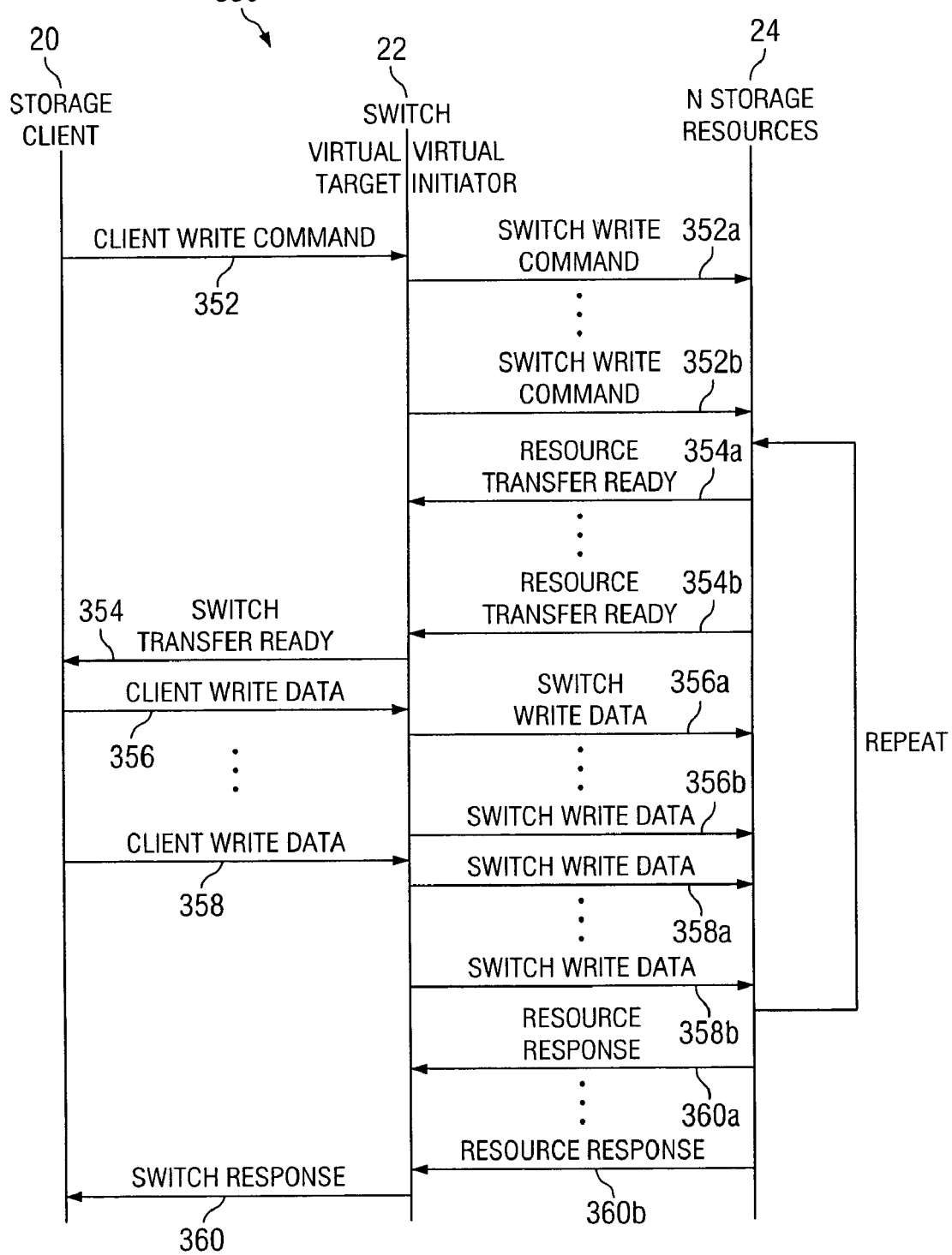

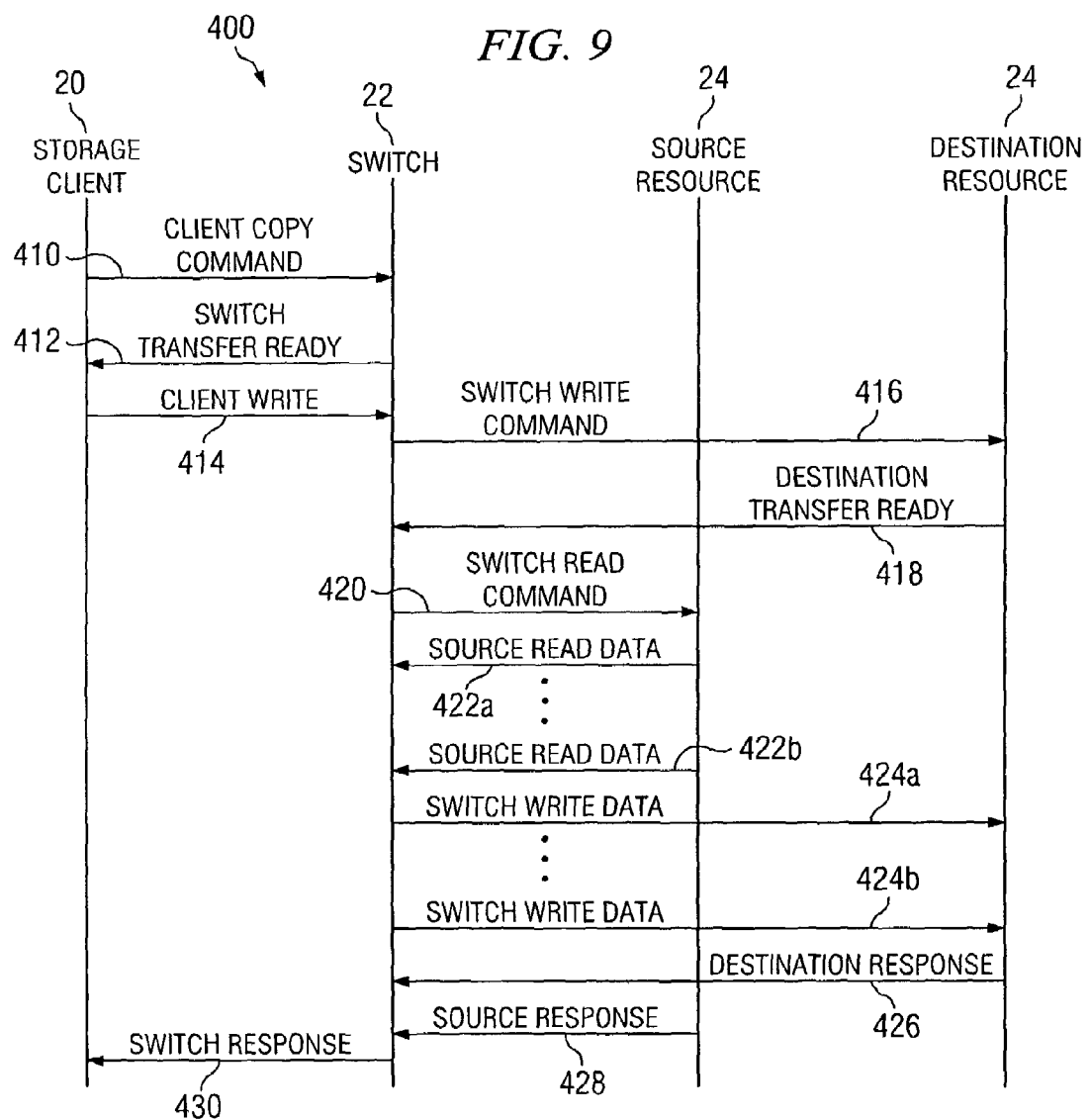

PROCESSING DATA PACKETS AT A STORAGE SERVICE MODULE OF A SWITCH

TECHNICAL FIELD OF THE INVENTION

This invention relates generally to the field of data storage and more specifically to processing data packets at a storage service module of a switch.

BACKGROUND OF THE INVENTION

Switches of storage area networks route data between storage clients and storage resources. These switches, however, typically cannot efficiently perform other operations of the storage area network. Consequently, known switches may be inadequate in certain situations.

SUMMARY OF THE INVENTION

In accordance with the present invention, disadvantages and problems associated with previous techniques for data storage may be reduced or eliminated.

According to one embodiment of the present invention, routing a data packet of an information unit sequence includes receiving at a switch a data packet of an information unit sequence of a block storage exchange from a storage client, where the sequence is associated with a source identifier and a target identifier identifying a target. A storage resource identifier corresponding to the target identifier is determined according to a forwarding table. A sequence identifier is associated with the source identifier, where the sequence identifier corresponds to the target. The source identifier and the sequence identifier are recorded at a context table, and the data packet is routed according to the storage resource identifier.

Certain embodiments of the invention may provide one or more technical advantages. A technical advantage of one embodiment may be that a removable storage service module may be used to perform packet processing operations at a switch. The storage service module may be readily coupled to a line card in order to implement the processing operations. Another technical advantage of one embodiment may be that target virtualization may be performed at the storage service module. Targets may be configured and reconfigured by changing a table at the storage service module.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 1 is a block diagram illustrating one embodiment of a storage area network for storing and retrieving data;

FIG. 3 is a block diagram illustrating one embodiment of a system that includes one or more storage service modules that may perform storage services;

FIG. 4 is a block diagram illustrating one embodiment of a system that includes a switch having one embodiment of a virtualization engine;

FIG. 8 is a ladder diagram illustrating one embodiment of a method for synchronous replication; and FIG. 9 is a ladder diagram illustrating one embodiment of a method for copying data from a source resource to a destination resource.

DETAILED DESCRIPTION OF THE DRAWINGS

Figure 2A:
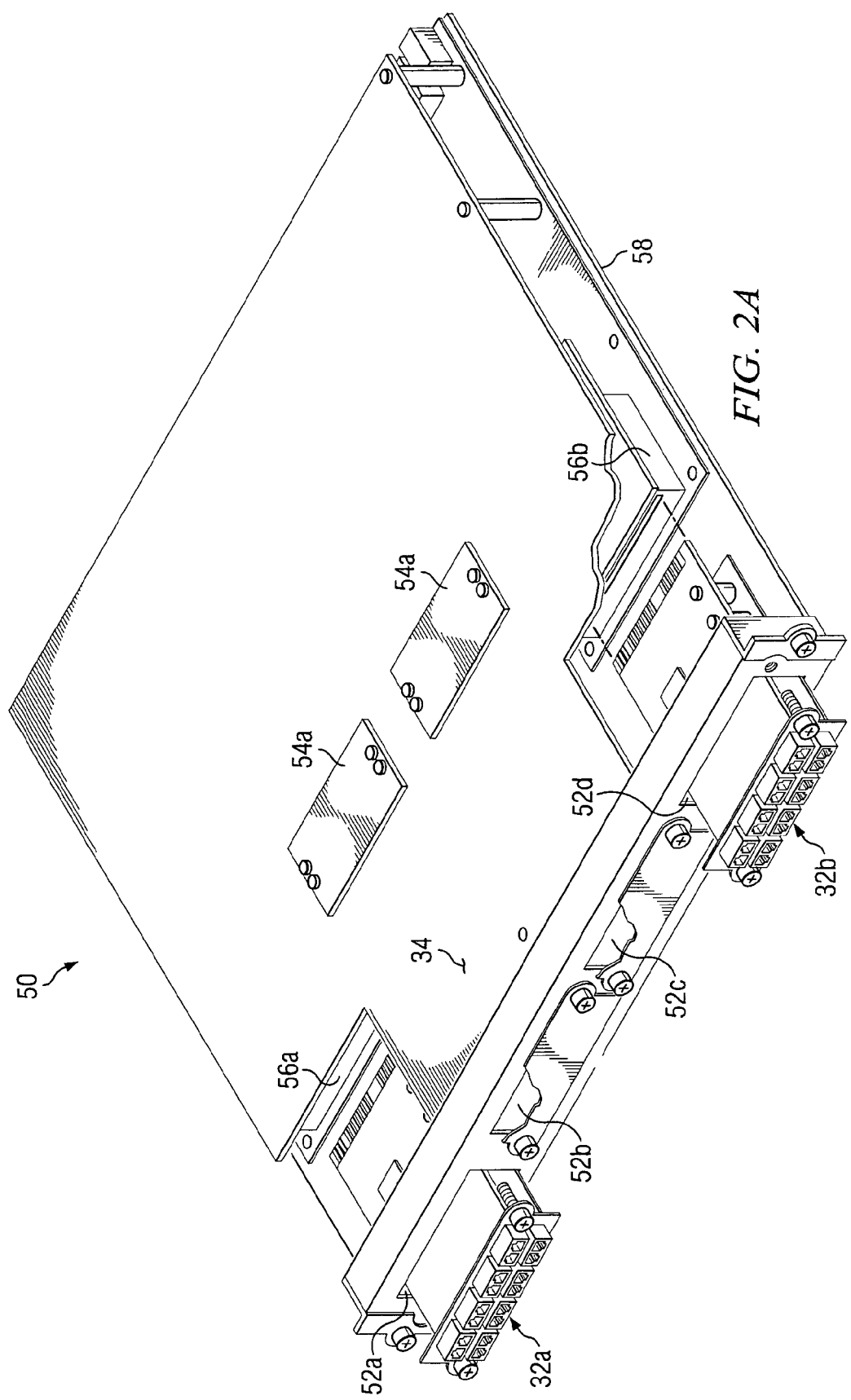
FIG. 2A illustrates an example system for processing and routing data packets.

Embodiments of the present invention and its advantages are best understood by referring to FIGS. 1 through 9 of the drawings, like numerals being used for like and corresponding parts of the various drawings.

FIG. 1 is a block diagram illustrating one embodiment of a storage area network 10 for storing and retrieving data. In general, storage area network 10 includes a switch that has a packet processor and a storage service module. The packet processor sends and receives data packets, while the storage service module may be used to perform additional processing on the data packets. For example, the storage service module may be used to perform block storage virtualization operations on the data packets.

According to the illustrated embodiment, storage area network 10 includes one or more storage clients 20, one or more communication networks 21 and 23, a switch 22, and one or more storage resources 24 coupled as shown in FIG. 1. Storage area network 10 may process and route data packets according to any of a number of communication protocols, for example, InfiniBand (IB), Gigabit Ethernet (GE), or Fibre Channel (FC).

Data packets are typically used to transport data within storage area network 10. A data packet may include a header that has a source identifier and a destination identifier. The source identifier, for example, a source address, identifies the transmitter of information, and the destination identifier, for example, a destination address, identifies the recipient of the information.

One or more storage clients 20 operate as initiators that communicate with switch 22 to store and retrieve data. Storage clients 20 may comprise a computer. As used in this document, the term "computer" refers to any suitable device operable to accept input, process the input according to predefined rules, and produce output, for example, a personal computer, workstation, network computer, wireless data port, wireless telephone, personal digital assistant, one or more processors within these or other devices, or any other suitable processing device.

Communication network 21 provides communication links between storage clients 20 and switch 22. Communication network 21 may include a public switched telephone network (PSTN), a public or private data network, the Internet, a wired or wireless network, a local, regional, or global communications network, or any other network suitable for providing communication between storage clients 20 and switch 22.

Switch 22 stores and retrieves data at one or more storage resources 24, and may communicate with storage resources 24 using any suitable protocol, for example, a Small Computer System Interface (SCSI) protocol such as the Fibre Channel Protocol (FCP), Small Computer System Interface RDMA Protocol (SRP), or Internet SCSI (iSCSI) protocol. Switch 22 may comprise logic encoded in any suitable medium such as hardware, firmware, or software or any combination of the preceding. Switch 22 is described in more detail with reference to FIG. 2.

Switch 22 includes one or more line cards 30 that may each include a packet processor 33, one or more paddles 32, and one or more storage service modules 34 configured as shown in FIG. 1. Paddles 32, packet processor 33, and storage service module 34 may be included on the same or different line cards 30. Line card 30 includes devices that route and process data packets communicated between storage clients 20 and storage resources 24. Line card 30 may include interfaces such as paddle slots that receive detachable paddle 32 and detachable storage service module 34.

An example data path 36 illustrates the path of a data packet from a storage client 20, through ingress paddle 32 and to packet processor 33. Packet processor 33 sends the data packet to storage service module 34 for processing. After processing, storage service module 34 sends the data packet to packet processor 33. Packet processor 33 sends the data packet to egress paddle 32 to storage resource 24. A data packet may be transported from storage resource 24 to storage client 20 along the reverse of data path 36.

Paddles 32 may be at substantially the same or different line card 30 or at substantially the same or different switch 22 as each other or as storage service module 34, allowing storage service module 34 to be shared among more than one line card 30. The ingress ports may be on the substantially the same or different paddle 32, on the substantially the same or different line card 30, or at substantially the same or different switch 22 as the egress ports.

A paddle 32 receives data packets from any suitable number of physical links. The physical links may comprise, for example, optical fiber cables or other fibers suitable for communicating data packets such as fibers operable to communicate electrical signals, for example, copper fibers. Paddle 32 may convert optical data signals into electrical data signals, if appropriate. Paddle 32 may comprise, for example, gigabit interface converters (GBIC) having any suitable port such as an InfiniBand, Ethernet, or Fibre Channel port that supports any suitable speed.

According to one embodiment, storage service module 34 may perform additional processing procedures on the data packets routed between storage clients 20 and storage resources 24 to provide storage services. An example storage service module 34 is described in more detail with reference to FIG. 3. Storage service module 34 may, for example, provide block storage virtualization. A storage client 20 may use virtual targets that operate as virtual initiators to access data from storage resources 24 corresponding to the virtual targets. A virtual target typically does not correspond directly to a storage resource 24. For example, virtual target V may correspond to storage resources A and B, virtual target W may correspond to storage resource A, and virtual target X may correspond to storage resources A and C. A virtual target may correspond to any suitable number of storage resources 24, and any suitable number of virtual targets may correspond to a storage resource 24.

According to one embodiment, switch 22 presents a storage client 20 with virtual targets accessible by the storage client 20. Storage client 20 operates as an initiator by requesting to store or retrieve data located at a virtual target. Storage service module 34 operates as the virtual target for storage client 20 by processing the request and by determining the correspondence between the virtual target and storage resources 24. Storage service module 34 operates as a virtual initiator for targets 202 by requesting to store or retrieve data at storage resources 24. Block storage virtualization is described in more detail with reference to FIG. 4. Other example storage services performed by storage service module 34 are described with reference to FIGS. 5 through 9.

Communication network 23 provides communication links between switch 22 and storage resources 24. Communication network 23 may include a public switched telephone network (PSTN), a public or private data network, the Internet, a wired or wireless network, a local, regional, or global communications network, or any other network suitable for providing communication between switch 22 and storage resources 24. Storage resources 24, labeled A, B, and C, store data that may be retrieved by storage clients 20, and may comprise physical storage devices such as databases. Although three storage resources are illustrated, storage area network 10 may comprise any suitable number of storage resources 24.

Certain embodiments of storage service module 34 may provide one or more advantages over known techniques. Known techniques for block storage virtualization may provide block storage virtualization functionality at storage clients 20, at storage resources 24, or at ports of switch 22. Known techniques, however, typically do not provide for efficient reconfiguration in certain situations such as target failure. For example, if a virtualization device associated with a virtualized target experience failure, known techniques typically cannot readily reconfigure the virtualized target to other virtualization devices.

A known technique for accommodating target failure involves assigning all storage resources 24 to each virtual target. In case of a target failure, a different target may be used to access storage resources 24 associated with the failed target. This technique, however, requires complex procedures to identify storage resources 24 through multiple targets.

Providing block storage virtualization functionality at storage service module 34 may provide for more efficient block storage virtualization. For example, in case of failure at one storage service module 34, the tables at another storage service module 34 may be readily reconfigured to reroute data packets. As another example, block storage virtualization may be efficiently implemented using pluggable storage service module 34.

Modifications, additions, or omissions may be made to storage area network 10 without departing from the scope of the invention. For example, storage area network 10 may include more or fewer storage clients 20 or more or fewer storage resources 24. Moreover, the operations of the system may be performed by more or fewer modules. For example, the operations of paddle 32 and storage service module 34 may be performed by one module, or the operations of storage service module 34 may be performed by more than one module. Additionally, functions may be performed using any suitable logic comprising software, hardware, other logic, or any suitable combination of the preceding. As used in this document, "each" refers to each member of a set or each member of a subset of a set.

Storage Service Module

FIG. 2A illustrates an example system 50 for processing and routing data packets. System 50 includes a line card that has one or more slots, where each slot is operable to accept either a paddle or a storage service module. Accordingly, system 50 may provide for efficient implementation of routing services, switch services, or both.

According to the illustrated embodiment, system 50 includes line card 30, one or more paddles 32a-b, one or more storage service modules 34, and a line card board 58 coupled as shown in FIG. 2A. Line card 30 has an interface comprising slots 52a-d, where each slot 52a-d is operable to accept either a paddle 32a-b or a storage service module 34. Line card 30 may include coupling devices 54a-b used to couple storage service module 34 to line card board 58, and coupling devices 56a-b used to couple paddles 32a-b to line card board 58. Examples of coupling devices 54a-b and 56a-b are described in more detail with reference to FIGS. 2B and 2C, respectively.

Modifications, additions, or omissions may be made to system 50 without departing from the scope of the invention. Moreover, system 50 may comprise more, fewer, or other components.

Figure 2B:
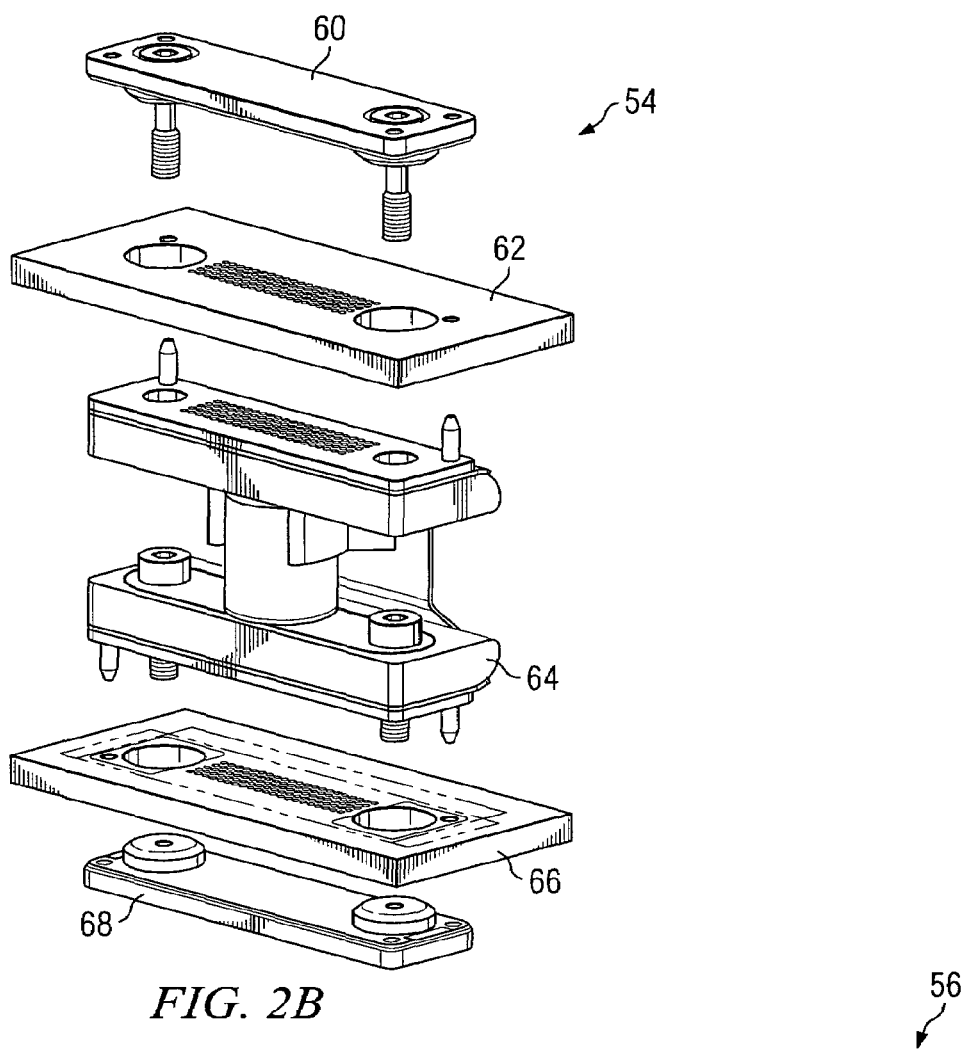
FIG. 2B is a diagram illustrating one embodiment of a coupling device that may be used to couple a paddle to a line card.

FIG. 2B is a diagram illustrating one embodiment of coupling device 54 that may be used to couple storage service module 34 to line card 30. According to the illustrated embodiment, coupling device 54 includes a bolster 60, a mezzanine board 62, a coupling assembly 64, a line card board 66, and a bolster 68 coupled as shown in FIG. 2B. Mezzanine board 62 may comprise, for example, storage service module 34, and line card board 66 may comprise line card board 58. For illustration purposes only, the components of coupling device 54 are shown as separated, but may be coupled as indicated in order to configure coupling device 54.

According to one embodiment, bolster 60 may comprise an insulated bolster, and may be coupled to mezzanine board 62 by, for example, screws. Mezzanine board 62 may comprise any suitable board of any suitable thickness such as 0.092 to 0.125 inches. Coupling assembly 64 comprises a connector operable to connect storage service module 34 to line card 30. Screws may be used to couple coupling assembly 64 to line card board 66. Line card board 66 may comprise any suitable board having any suitable thickness such as 0.092 to 0.125 inches. Bolster 68 may comprise an insulated bolster coupled to line card board 66 with, for example, an adhesive.

Modifications, additions, or omissions may be made to coupling device 54 without departing from the scope of the invention. Moreover, coupling device 54 may comprise more, fewer, or other components.

Figure 2C:
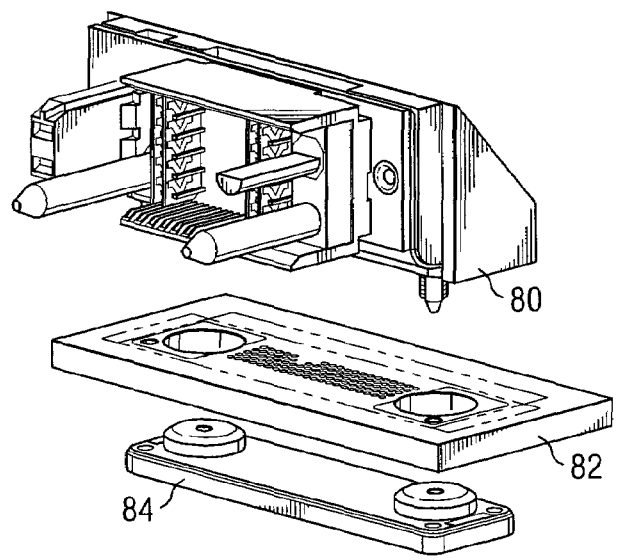
FIG. 2C is a diagram illustrating one embodiment of a coupling device that may be used to couple a storage service module to a line card.

FIG. 2C is a diagram illustrating one embodiment of a coupling device 56 that may be used to couple paddle 32 to line card 30. According to the illustrated embodiment, coupling device 56 includes a coupling assembly 80, a line card board 82, and a bolster 84 coupled as shown in FIG. 2C. Line card board 82 may comprise, for example, line card board 58. For illustration purposes only, the components of coupling device 56 are shown as separated, but may be coupled as indicated in order to configure coupling device 56.

According to one embodiment, coupling assembly 80 may comprise an angle connection assembly having substantially a right angle that may be coupled to line card board 82 using, for example, screws. Line card board 82 may be substantially similar to line card board 66 of FIG. 2B, and bolster 84 may be substantially similar to bolster 68 of FIG. 2B. By providing substantially similar line card boards 66 and 82 and bolsters 68 and 84, coupling assemblies 64 and 80 may be readily interchanged. Accordingly, coupling assembly 64 may be readily coupled to a line card board in order to couple a storage service module 34 to line card 30, or coupling assembly 80 may be coupled to a line card board in order to couple a paddle 32 to line card 30. As a result, either paddle 32 or storage service module 34 may be readily coupled to line card 30.

Modifications, additions, or omissions may be made to coupling device 56 without departing from the scope of the invention. Moreover, coupling device 56 may comprise more, fewer, or other components.

FIG. 3 is a block diagram illustrating one embodiment of a system 158 that includes one or more storage service modules 34 that may perform storage services for storage area network 10 of FIG. 1. For simplification purposes, the details of all of the storage service modules 34 of FIG. 4 are not shown. Storage service modules 34 may, however, be substantially similar such that each storage service module 34 may perform storage services. The distributed architecture provided by multiple storage service modules 34 may support efficient scalability.

According to one embodiment, system 158 includes one or more storage service modules 34 coupled to a computer 150 and one or more packet processors 116 as illustrated in FIG. 3. Computer 150 may be used to manage the operation of storage service modules 34, and may be coupled to storage service modules 34 using an Ethernet/Internet Protocol local area network or any other suitable network.

According to one embodiment, a storage service module 34 may include an interface 160, a processor 162, a memory 164, and one or more accelerators 168 coupled as shown in FIG. 4. Interface 160 communicates information between computer 150 and storage service module 34, and may comprise, for example, and Ethernet controller such as a 10/100 base T Ethernet controller. Processor 162 controls the operation of storage service module 34, and may comprise a central processing unit such as an X86 central processing unit or any other suitable processor. Memory 164 stores data that may be used by processor 162, and, may comprise, for example, a dynamic random access memory (DRAM) dual inline memory module (DIMM) or any other suitable memory module.

An accelerator 168 accelerates data packets passing through storage service module 34, and may comprise a field programmable gate array (FPGA). According to one embodiment, accelerator 168 may be operable to handle 10G Fibre Channel port wire speed traffic, which may provide a cut-through method with low latency. Accelerator 168 may include one or more (possibly embedded) processors 180 and a virtualization engine 182 coupled as shown in FIG. 4. Processors 180 control the operation of virtualization engine 182, and may comprise, for example, PowerPC processors. Virtualization engine 182 provides for virtualization of targets. The operation of virtualization engine 182 is described in more detail with reference to FIG. 4.

In certain situations, a data packet may be transferred out of virtualization engine 182 to be processed by processors at other locations. For example, if a data packet has a cyclic redundancy check (CRC) error, the data packet may be transferred out of virtualization engine 182 to be handled at processor 180. If a data packet has a command that cannot be processed at virtualization engine 182, the data packet may be transferred to processor 162 for handling. Other examples of reasons why a data packet may be transferred may include: the data packet is directed to processor 162; a value of the data packet such as start of frame (SOF), the destination identifier, the source identifier, or sequence identifier is inappropriate; or any other suitable reason for transferring a data packet out of virtualization engine 182.

Modifications, additions, or omissions may be made to system 158 without departing from the scope of the invention.

For example, a storage service module 34 may include more or fewer processors 180, or storage service modules 34 may be substantially similar or different. Moreover, the operations of the system may be performed by more or fewer modules. For example, the operations of processors 180 may be performed by one module, or the operations of virtualization engine 150 module may be performed by more than one module. Additionally, functions may be performed using any suitable logic comprising software, hardware, other logic, or any suitable combination of the preceding.

Block Storage Virtualization

Figure 5:
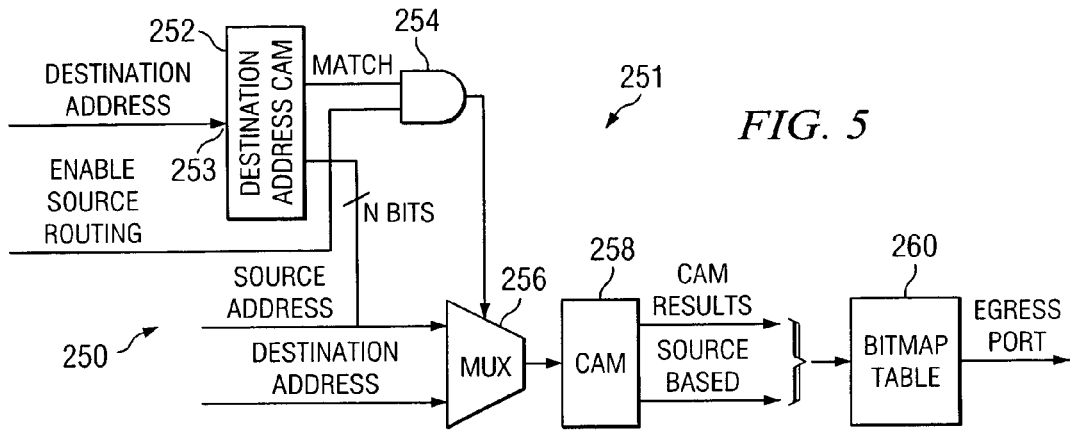
FIG. 5 is a block diagram of one embodiment of a device for routing a data packet according to the source address of the data packet.

FIG. 4 is a block diagram illustrating one embodiment of a system 200 that includes switch 22 having one embodiment of virtualization engine 182 that may be used to perform block storage virtualization. System 200 includes one or more storage clients 20a-b, switch 22, and one or more storage resources 24a-c coupled as shown in FIG. 5. One or more virtual targets/initiators 202a-b are used to access storage resources 24b-c.

Storage clients 20a-c have identifiers $C_1$, $C_2$, and $C_3$, respectively. Switch 22 includes one or more ingress ports 210, one or more egress ports 212, a forwarding device 214, a forwarding table 216, one or more free lists 218, and a context table 220. In the illustrated embodiment, ingress ports 210 are labeled 0, 1, 2, 3, and 4, and egress ports 210 are labeled 5, 6, 7, 8, and 9. Storage resource 24a has a resource identifier $R_1$.

Forwarding device 214 is used to determine if a data packet is destined for a virtual target, and to route the data packet based on the source address of the data packet if the data packet is destined for a virtual target. An example of forwarding device 216 is described in more detail with reference to FIG. 6. Forwarding table 216 is used to forward a data packet based on either the source address or the destination address of the data packet. Forwarding table 216 may associate a source or destination address with a forwarding port.

Virtual targets/initiators 202a-b are used to access storage resources 24a-c. In the illustrated embodiment, virtual target/initiator 202a is used to access storage resource 24b, and virtual target/initiator 202b is used to access storage resources 24b-c. According to one embodiment, virtual targets/initiators 202a-b may have substantially the same target identifier $T_1$ known to storage clients 20a-c. Using substantially the same target identifier may provide for more efficient migration. For example, if a virtual target/initiator 202a-b fails, the storage client 20b-c that uses the failed virtual target/initiator 202a-b may be migrated to another virtual target/initiator 202a-b by reconfiguring forwarding table 214, without any reconfiguration of storage client 20b-c.

TABLE 1 is an example forwarding table 214 that illustrates virtual targets/initiators 202a-b that have substantially the same target identifier $T_1$. TABLE 1 illustrates only an example of forwarding table 216.

TABLE 1

| Row | Source Address | Destination Address | Forwarding Port Number |
|---|---|---|---|
| 1 | N/A | $R_1$ | 5 |
| 2 | $C_2$ | $T_1$ | 7 |
| 3 | $C_3$ | $T_1$ | 9 |

According to TABLE 1, if the destination address identifies a physical storage resource 24a-c, the data packet is routed according the destination address, and if the destination address of a data packet identifies a virtual target, the data packet is routed according to the source address of the data packet. Row 1 indicates that a data packet destined for storage resource $R_1$ is routed through port 5. Rows 2 and 3 specify how data packets destined for virtual target $T_1$ from different sources are to be routed. Row 2 indicates that data packets from storage client $C_2$ are routed through port 7, and row 3 specifies that data packets from storage client $C_3$ are routed through port 9.

According to one embodiment, switch 22 may be used to forward data packets comprising Fibre Channel frames. To forward a Fibre Channel frame, fields of the Fibre Channel frame may be rewritten. The fields may include, for example, the destination address, the source address, the frame control, the sequence identifier, the originator exchange identifier, and the responder exchange identifier. Fields associated with a SCSI command specifying a location of virtual target/initiator 202a-b including a logical unit number (LUN), a top and bottom logical block address (LBA), and a burst length may also be rewritten. Other SCSI information units such as transfer ready, data, and response may also be rewritten.

An operation performed according to a protocol such as the Fibre Channel protocol is known as an exchange, where each exchange may include three or four types of sequences. A free list 218 lists available sequence identifiers and exchange identifiers, and is used to allocate the number of sequences and exchanges that are directed to a particular target. An identifier from a free list 218 is assigned to a sequence and exchange between a storage client 20a-c and a target such as storage resource 24a-c or virtual target/initiator 202a-c. Sequences above the maximum number of sequences may be sent elsewhere for processing.

According to one embodiment, free lists 218 may include a target free list, an initiator free list, and an exchange free list. A target free list provides sequence identifiers for sequences destined to a particular target, and an initiator free list provides sequence identifiers for sequences destined to a particular initiator. The exchange free list assigns an exchange identifier to an exchange of sequences. Exchange identifiers may be returned to the exchange free list upon receipt of a message that indicates the end of the exchange.

Context table 220 maintains information established during the initial phases of an exchange in order to properly route data packets during the exchange. Context table 220 may include the following information taken from sequences from storage client 20a-c or from virtual target/initiator 202a-b: initiator identifier, target identifier, initiator sequence identifier, target sequence identifier, sequence count, and status. Context table 220, however, may include more, fewer, or other entries. The exchange identifier of the exchange may be used as an index for the information.

Modifications, additions, or omissions may be made to system 200 without departing from the scope of the invention. For example, switch 22 may include more or fewer ports. Moreover, the operations of the system may be performed by more or fewer modules. For example, the operations of forwarding device 214 and forwarding table 216 may be performed by one module, or the operations of forwarding device 214 may be performed by more than one module. Additionally, functions may be performed using any suitable logic comprising software, hardware, other logic, or any suitable combination of the preceding.

Source Address Routing

Figure 6:
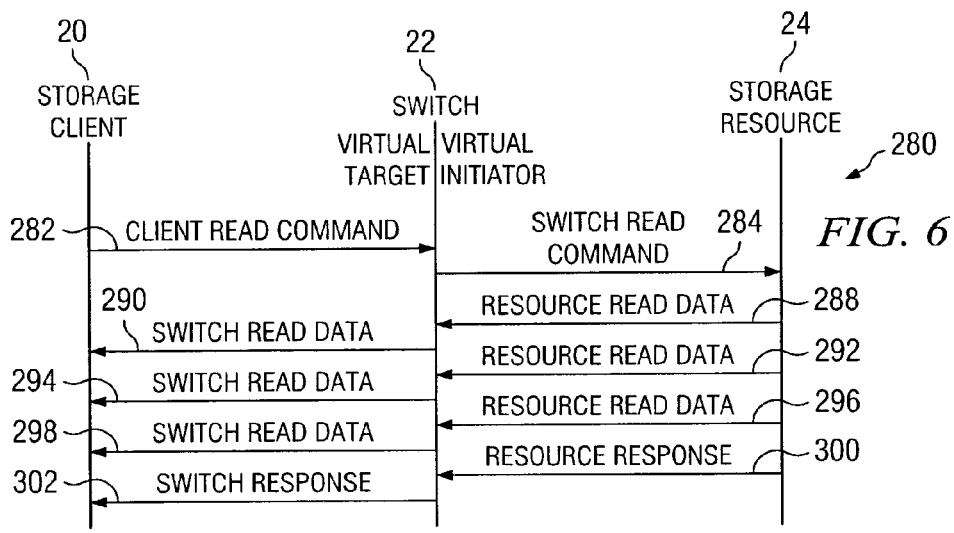
FIG. 6 is ladder diagram illustrating one embodiment of a method for retrieving data from a storage resource.

FIG. 5 is a block diagram of a device 250 for routing a data packet to a virtual target based on the source address of the data packet. Device 250 includes one or more modules operable to forward a data packets such as a destination address content addressable memory (CAM) 252, an AND gate 254, a multiplexer (MUX) 256, a content addressable memory (CAM) 258, and a bit map table 260 coupled as shown in FIG. 6. According to one embodiment, device 250 receives a destination address and a source address of a data packet through an input, and determines an egress port 212 through which the data packet is to be routed according to the destination address or the source address.

Destination address CAM 252 compares the destination address received at an input 253 with an address of a virtual target/initiator 202a-b to determine if the destination address matches or is substantially similar to the virtual target address. One or more outputs of destination address CAM 252 may include an n-bit output indicating which address matched as well as a match output indicating a match. Destination address CAM 252 may include $2^n$ addresses that may be placed in consecutive order, where a virtual target address comprises a programmable value such as a 20-bit programmable value. According to one embodiment, the least significant n-bits of the virtual target address may be excluded, which may allow a storage client 20a-b to select up to $2^n$ separate virtual targets 202a-b.

According to one embodiment, the n-bit output of the destination address CAM 252 may be concatenated with the source address in order to allow the source address to be associated with n different virtual targets. AND gate 254 receives the match output from destination address CAM 252 and receives an enable source routing signal. If source routing is enabled and if the destination address matches the virtual target address, AND gate 254 signals multiplexer 256 to select the source address to route the data packet according to the source address. Otherwise, the destination address is selected.

Content addressable memory 258 searches forwarding table 216 for a forwarding port corresponding to the address received from multiplexer 256. Content addressable memory 258 outputs CAM results that represent the forwarding port and an indication specifying whether the results are based on a source address. The CAM results may comprise an n-bit indication specifying an entry of bit map table 260, which includes a bitmap of egress ports 212. By setting the appropriate bits, the data packet is directed through the appropriate egress port.

Modifications, additions, or omissions may be made to the system without departing from the scope of the invention. For example, a memory other than content addressable memory 258 may be used to determine the forwarding port. Moreover, the operations of the system may be performed by more or fewer modules. For example, the operations of content addressable memory 258 and bitmap table 260 may be performed by one module, or the operations of bitmap table 260 may be performed by more than one module. Additionally, functions may be performed using any suitable logic comprising software, hardware, other logic, or any suitable combination of the preceding.

Storage Services

FIG. 6 is a ladder diagram 280 illustrating one embodiment of a method for retrieving data from storage resource 24. Ladder diagram 280 shows communications between storage client 20, switch 22, and storage resource 24. Switch 22 operates as a virtual target for storage client 20, and a virtual initiator for storage resource 24.

Storage client 20 sends a client read command 282 to switch 22 operating as a virtual target in order to request data from the virtual target. Switch 22 may verify the fields of client read command 282. If the fields are not verified, client read command 282 may be transmitted to another device for handling. Switch 22 assigns a sequence identifier from a target free list associated with the virtual target, and assigns an exchange identifier assigned from an exchange free list. A destination address, a logical unit number, and a logical block address corresponding to the virtual target may be determined using forwarding table 216. An entry recording a source address, an exchange identifier, and the sequence identifier is created in context table 220.

Switch 22 rewrites client read command 282 to generate a switch read command 284 requesting data for storage client 20, and sends switch read command 284 to storage resource 24. In response to receiving switch read command 284, storage resource 24 sends resource read data sequence 288 to switch 22. Switch 22 verifies the fields of resource read data sequence 288. If a problem is detected, resource read data sequence 288 may be directed to an outside device. Problems may result from, for example, a cyclic redundancy character (CRC) error or lost data packets. The data packets are updated by replacing the source address with the destination address and by updating the exchange identifier and the sequence identifier.

Switch 22 determines from the addresses recorded at context table 220 that the read data sequence is for storage client 20, and sends switch read data sequence 290 to storage client 20. Storage resource 24 sends resource read data sequence 292 to switch 22, which in turn sends switch read data sequence 294 to storage client 20. Storage resource 24 sends resource read data sequence 296 to switch 22, which in turn sends switch read data sequence 298 to storage client 20. After sending the requested data, storage resource 24 sends a resource response 300. Switch 22 verifies the fields of resource response 300 and updates the data packets by replacing the source address with the destination address and by updating the exchange identifier and the sequence identifier in order to generate a switch response 302, which is sent to storage client 20.

According to one embodiment, switch 22 includes accelerator 168 comprising hardware that sends data to storage client 20 as data is received from storage resource 24. In contrast, known virtualization techniques use software that must wait until resource response 300 has been received before forwarding the data to storage client 20. Accordingly, switch 22 may provide for more efficient transmission of data from storage resource 24 to storage client 20.

Modifications, additions, or omissions may be made to the method without departing from the scope of the invention. For example, more or fewer data sequences may be sent from storage resource 24. Additionally, steps may be performed in any suitable order without departing from the scope of the invention.

Figure 7:
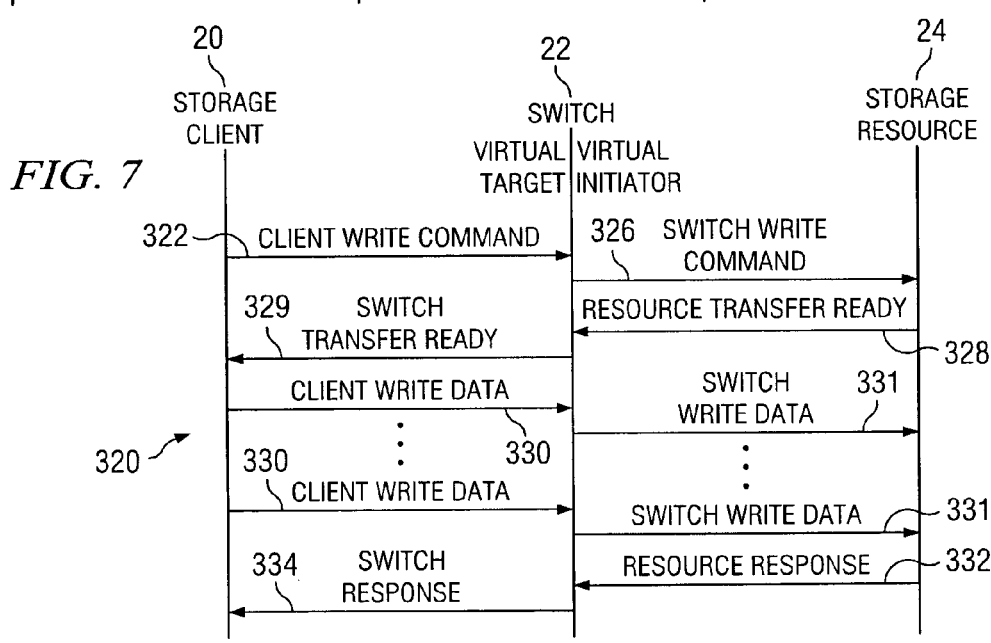
FIG. 7 is a ladder diagram illustrating one embodiment of a method for writing data to a storage resource.

FIG. 7 is a ladder diagram 320 illustrating one embodiment of a method for writing data to storage resource 24. The method begins with storage client 20 sending a client write command 322 to switch 22 operating as a virtual target. Switch 22 verifies the fields of client write command 322. If the fields cannot be verified, client write command 322 may be sent to an outside device for processing. Switch 22 assigns a sequence identifier from an initiator free list, and an exchange identifier from an exchange free list. The destination address, logical unit number, and logical block address corresponding to the virtual target may be determined using forwarding table 216. An entry in context table 220 is created in order to record the source address, the exchange identifier, and the sequence identifier.

Switch 22 rewrites client write command 322 to generate a switch write command 326, which is sent to storage resource 24. In response, storage resource 24 sends a resource transfer ready sequence 328 to switch 22, which sends a switch transfer ready sequence 329 with virtual target source identifier and previously saved context to storage client 20. In response, storage client 20 sends client write data sequence 330 to switch 22, which verifies client write data sequence 330. The data packets are updated by replacing the source address with the destination address and by updating the exchange identifier and the sequence identifier. If any problem with client write data sequence 330 is detected, client write data sequence 330 may be sent to another device for processing.

Switch 22 sends switch write data sequence 331 to storage resource 24. According to one embodiment, accelerator 168 comprising hardware sends switch write data sequence 331 as client write data sequence 330 is received from storage client 20. After storage resource 24 receives the last client write data sequence 331, storage resource 24 sends a resource response 332. Switch 22 verifies the fields of resource response 332, and updates the data packets by replacing the source address with the destination address and by updating the exchange identifier and the sequence identifier. Switch 22 generates a switch response 334 to send to storage client 20. The method then terminates.

Modifications, additions, or omissions may be made to the method without departing from the scope of the invention. For example, more or fewer write data sequences may be sent. Additionally, steps may be performed in any suitable order without departing from the scope of the invention.

FIG. 8 is a ladder diagram 350 illustrating one embodiment of a method for synchronous replication. According to the embodiment, data sent from storage client 20 to a target is substantially simultaneously replicated to a number of storage resources 24. The method begins when storage client 20 sends a client write command 352 to switch 22. Switch 22 sends a switch write command 352a-b to each of the n storage resources 24.

In response, each storage resource 24 sends a resource transfer ready sequence 354a-b to switch 22. A resource transfer ready sequence 354a-b sent by a storage resource 24 indicates the burst length that may be accommodated by the storage resource 24. Switch 22 determines the minimum burst length, and sends a switch transfer ready sequence 354 to storage client that includes the minimum burst length along with the virtual target source identifier and previously saved context. If a target has a burst length that is greater than the minimum burst length, the additional burst length is recorded in the exchange context for the target.

Storage client 20 sends the requested amount of data using any suitable number of sequences of client write data 356-358. Switch 22 substantially simultaneously sends switch write data sequence 356a-b through 358a-b to the n storage resources 24. According to one embodiment, accelerator 168 may reformat and send switch write data sequences 356a-b-358a-b as each client write data write data sequence 356-358 is received from storage client 20. Storage resources 24 may respond with new resource transfer ready sequences 354a-b to switch 22 if their initial burst lengths have been fulfilled. If a storage resource 24 has a burst length that is larger than the minimum burst length, the storage resource 24 does not return a resource transfer ready sequence 354a-b. In response to receiving a transfer ready sequence, switch sends a switch transfer ready sequence 354 to storage client 20.

The transfer ready sequences and write data sequences are communicated until the requested data has been transferred. When the last write data has been written to storage resources 24, each storage resource 24 sends or may have sent a resource response 360a-b. Switch 22 sends a switch response 360 to storage client. The method then terminates.

Modifications, additions, or omissions may be made to the method without departing from the scope of the invention. Additionally, steps may be performed in any suitable order without departing from the scope of the invention.

FIG. 9 is a ladder diagram 400 illustrating one embodiment of a method for copying data from a source resource 24 to a destination resource 24 at the request of a storage client 20. The method begins with storage client 20 sending a client copy command 410 comprising a third party copy command to switch 22. Client copy command 410 includes a scatter/gather list that provides instructions for copying data from source resource 24 to destination resource 24. Switch 22 responds with a switch transfer ready sequence 412 indicating the amount of data that can be accommodated. Storage client 20 sends descriptor information describing source resource 24 and destination resource 24 to switch 22 using a client write sequence 414.

Switch 22 sends a switch write command 416 to destination resource 24. In response, destination resource 24 sends a destination transfer ready sequence 418 to switch 22. Destination transfer ready sequence 418 includes a burst length. Switch creates an entry in context table 220 for the exchange, and sends a switch read command 420 to source resource 24.

Source resource 24 sends one or more source read data sequences 422a-b to switch 22, which in turn sends one or more switch write data sequences 424a-b to destination resource 24. Destination resource 24 sends a destination response 426 to switch 22, and source resource 24 sends a source response 428 to switch 22. In response, switch 22 sends a switch response 430 to storage client 20. The method then terminates.

Modifications, additions, or omissions may be made to the method without departing from the scope of the invention. Additionally, steps may be performed in any suitable order without departing from the scope of the invention.

Certain embodiments of the invention may provide one or more technical advantages. A technical advantage of one embodiment may be that a removable storage service module may be used to perform packet processing operations at a switch. Storage service module may be readily coupled to a line card in order to implement the processing operations. Another technical advantage of one embodiment may be that target virtualization may be performed at the storage service module. Targets may be configured and reconfigured by changing a table at the storage service module.

Although an embodiment of the invention and its advantages are described in detail, a person skilled in the art could make various alterations, additions, and omissions without departing from the spirit and scope of the present invention as defined by the appended claims.

What is claimed is:

1. A method for routing a data packet of an information unit sequence, comprising:

receiving at a switch a data packet of an information unit sequence of a block storage exchange from a storage client, the sequence associated with a source identifier and a target identifier identifying a target;

determining a storage resource identifier corresponding to the target identifier according to a forwarding table;

associating a sequence identifier with the source identifier, the sequence identifier corresponding to the target;

recording the source identifier and the sequence identifier at a context table;

routing the data packet according to the storage resource identifier;

receiving a next data packet associated with the sequence identifier; and routing the next data packet according to the context table.

2. The method of claim 1, wherein the sequence comprises a read command, and further comprising repeating the following until a final response is received from the storage resource:

receiving data from the storage resource; and routing the data to the storage client using a hardware accelerator.

3. The method of claim 1, wherein the sequence comprises a write command, and further comprising repeating the following until a final response is received from the storage client:

receiving data from the storage client; and routing the data to the storage resource using a hardware accelerator.

4. The method of claim 1, wherein the sequence comprises a write command corresponding to a plurality of storage resources, the plurality of storage resources comprising the storage resource, and further comprising repeating the following until a final response is received from the storage client:

receiving data from the storage client; and routing the data to the plurality of storage resources using a hardware accelerator.

5. The method of claim 1, wherein the sequence comprises a third party copy command to copy data from the storage resource to a destination resource, and further comprising repeating the following until a final response is received from the storage resource:

receiving data from the storage resource; and routing the data to the destination resource.

6. A system for routing a data packet of an information unit sequence, comprising:

an interface of a switch operable to receive a data packet of an information unit sequence of a block storage exchange from a storage client, the sequence associated with a source identifier and a target identifier identifying a target; and a processor coupled to the interface and operable to:

determine a storage resource identifier corresponding to the target identifier according to a forwarding table;

associate a sequence identifier with the source identifier the sequence identifier corresponding to the target;

record the source identifier and the sequence identifier at a context table;

route the data packet according to the storage resource identifier;

receive a next data packet associated with the sequence identifier; and route the next data packet according to the context table.

7. The system of claim 6, wherein the sequence comprises a read command, and the processor is further operable to repeat the following until a final response is received from the storage resource:

receive data from the storage resource: and route the data to the storage client using a hardware accelerator.

8. The system of claim 6, wherein the sequence comprises a write command, and the processor is further operable to repeat the following until a final response is received from the storage client:

receive data from the storage client; and route the data to the storage resource using a hardware accelerator.

9. The system of claim 6, wherein the sequence comprises a write command corresponding to a plurality of storage resources, the plurality of storage resources comprising the storage resource, the processor is further operable to repeat the following until a final response is received from the storage client:

receive data from the storage client; and route the data to the plurality of storage resources using a hardware accelerator.

10. The system of claim 6, wherein the sequence comprises a third party copy command to copy data from the storage resource to a destination resource, and the processor is further operable to repeat the following until a final response is received from the storage resource:

receive data from the storage resource; and route the data to the destination resource.

11. Logic for routing a data packet of an information unit sequence, the logic embodied in a computer readable storage medium and operable to:

receive at a switch a data packet of an information unit sequence of a block storage exchange from a storage client, the sequence associated with a source identifier and a target identifier identifying a target;

determine a storage resource identifier corresponding to the target identifier according to a forwarding table;

associate a sequence identifier with the source identifier, the sequence identifier corresponding to the target;

record the source identifier and the sequence identifier at a context table;

route the data packet according to the storage resource identifier;

receive a next data packet associated with the sequence identifier; and route the next data packet according to the context table.

12. The logic of claim 11, wherein the sequence comprises a read command, and further operable to repeat the following until a final response is received from the storage resource:

receive data from the storage resource; and route the data to the storage client using a hardware accelerator.

13. The logic of claim 11, wherein the sequence comprises a write command, and further operable to repeat the following until a final response is received from the storage client:

receive data from the storage client; and route the data to the storage resource using a hardware accelerator.

14. The logic of claim 11, wherein the sequence comprises a write command corresponding to a plurality of storage resources, the plurality of storage resources comprising the storage resource, and further operable to repeat the following until a final response is received from the storage client:

receive data from the storage client; and route the data to the plurality of storage resources using a hardware accelerator.

15. The logic of claim 11, wherein the sequence comprises a third party copy command to copy data from the storage resource to a destination resource, and further operable to repeat the following until a final response is received from the storage resource:

receive data from the storage resource; and route the data to the destination resource.

16. A system for routing a data packet of an information unit sequence, comprising:

means for receiving at a switch a data packet of an information unit sequence of a block storage exchange from a storage client, the sequence associated with a source identifier and a target identifier identifying a target;

means for determining a storage resource identifier corresponding to the target identifier according to a forwarding table;
means for associating a sequence identifier with the source identifier, the sequence identifier corresponding to the target;
means for recording the source identifier and the sequence identifier at a context table;
means for routing the data packet according to the storage resource identifier,
means for receiving a next data packet associated with the sequence identifier; and
routing the next data packet according to the context table.

17. A method for routing a data packet of an information unit sequence, comprising:
receiving at a switch a data packet of an information unit sequence of a block storage exchange from a storage client, the sequence associated with a source identifier and a target identifier identifying a target;
determining a storage resource identifier corresponding to the target identifier according to a forwarding table;
associating a sequence identifier with the source identifier, the sequence identifier corresponding to the target;
recording the source identifier and the sequence identifier at a context table;
routing the data packet according to the storage resource identifier;
receiving a next data packet associated with the sequence identifier, and routing the next data packet according to the context table;
repeating the following until a final response is received from the storage resource if the sequence comprises a read command: receiving data from the storage resource, and routing the data to the storage client using a hardware accelerator;
repeating the following until a final response is received from the storage client if the sequence comprises a first write command: receiving data from the storage client, and routing the data to the storage resource using a hardware accelerator;
repeating the following until a final response is received from the storage client if the sequence comprises a second write command corresponding to a plurality of storage resources, the plurality of storage resources comprising the storage resource: receiving data from the storage client, and routing the data to the plurality of storage resources using a hardware accelerator; and
repeating the following until a final response is received from the storage resource if the sequence comprises a third party copy command to copy data from the storage resource to a destination resource: receiving data from the storage resource, and routing the data to the destination resource.

18. A method for routing a data packet, comprising:
receiving at a switch a first data packet from a storage client, the first data packet having a first source address and a first destination address, the first destination address corresponding to a target identifier;
determining a storage resource address corresponding to the target identifier;
rewriting the first destination address of the first data packet at a hardware accelerator, the rewritten first destination address comprising the storage resource address;
routing the first data packet according to the rewritten first destination address;
assigning an identifier to the first data packet;
recording the first source address of the first data packet at the switch;
receiving at the switch a second data packet from a storage resource corresponding to the storage resource address, the second data packet having a second source address and a second destination address, the second data packet associated with the identifier assigned to the first data packet;
retrieving the recorded first source address in accordance with the identifier assigned to the first data packet;
rewriting the second destination address of the first data packet at the hardware accelerator, the rewritten second destination address comprising the first source address; and
routing the first data packet according to the rewritten second destination address.

19. A system for routing a data packet, comprising:
an input operable to receive at a switch a first data packet from a storage client, the first data packet having a first source address and a first destination address, the first destination address corresponding to a target identifier; and
a processor coupled to the input and operable to:
determine a storage resource address corresponding to the target identifier;
rewrite the first destination address of the first data packet at a hardware accelerator, the rewritten first destination address comprising the storage resource address;
route the first data packet according to the rewritten first destination address;
assign an identifier to the first data packet;
record the first source address of the first data packet at the switch;
receive at the switch a second data packet from a storage resource corresponding to the storage resource address, the second data packet having a second source address and a second destination address, the second data packet associated with the identifier assigned to the first data packet;
retrieve the recorded first source address in accordance with the identifier assigned to the first data packet;
rewrite the second destination address of the first data packet at the hardware accelerator, the rewritten second destination address comprising the first source address; and
route the first data packet according to the rewritten second destination address.

20. Logic for routing a data packet, the logic embodied in a computer readable storage medium and operable to:
receive at a switch a first data packet from a storage client, the first data packet having a first source address and a first destination address, the first destination address corresponding to a target identifier;
determine a storage resource address corresponding to the target identifier;
rewrite the first destination address of the first data packet at a hardware accelerator, the rewritten first destination address comprising the storage resource address;
route the first data packet according to the rewritten first destination address;
assign an identifier to the first data packet;
record the first source address of the first data packet at the switch;

receive at the switch a second data packet from a storage resource corresponding to the storage resource address, the second data packet having a second source address and a second destination address, the second data packet associated with the identifier assigned to the first data packet;

retrieve the recorded first source address in accordance with the identifier assigned to the first data packet;

rewrite the second destination address of the first data packet at the hardware accelerator, the rewritten second destination address comprising the first source address; and route the first data packet according to the rewritten second destination address.

* * * * *